Patented Nov. 15, 1932

1,887,898

UNITED STATES PATENT OFFICE

OLOF GUSTAV BOHLIN, OF HELSINGBORG, SWEDEN, ASSIGNOR TO HELSINGBORGS GUMMIFABRIKS AKTIEBOLAG, OF HELSINGBORG, SWEDEN

PROCESS FOR THE REGENERATION OF VULCANIZED RUBBER

No Drawing. Application filed January 21, 1930, Serial No. 422,497, and in Germany December 27, 1929.

My invention relates to a process for the regeneration of vulcanized rubber whereby a regenerate is obtained which has the qualities of the rubber, being plastic and as capable of being vulcanized as the latter. In all regenerating processes the vulcanized rubber is subjected to a very thorough chemical treatment, e. g. a treatment with 40–60% sulphuric acid, or with alkali lye under heat and pressure followed by a vigorous mechanical working and rolling. By these processes a product is obtained which may be vulcanized in the same way as raw rubber after addition of sulphur, but which gives after vulcanization a product far inferior to the original rubber. If it be supposed, as is now commonly the case, that the most valuable qualities of the rubber, particularly its elasticity, depend on a greater or lesser aggregation or polymerization, and that the sulphur has the task to promote and stabilize the aggregation or polymerization, which is most advanced in vulcanized rubber, less in raw rubber in its original state and still less in raw rubber that has been plastified by a mechanical treatment or the like, this depreciation of the rubber during the regeneration may be explained by further supposing that, owing to the vigorous chemical and mechanical treatment, an extreme disaggregation or depolymerization has taken place. In regenerates fit for use a renewed aggregation or polymerization may be brought about by a treatment with sulphur—vulcanization—, but the products gained hereby are poorer the more advanced the disaggregation or depolymerization has been in the regenerate. One of the most essential purposes of my invention is to carry out the regeneration in such a way that the least possible opportunity is given to disaggregation or depolymerization. In most regenerating processes it has been supposed at first that the chief point was to expel the sulphur taken up in vulcanization, so as to reduce the rubber to its original state. Hitherto it has not, however, been possible to find any means of fully extracting the sulphur without otherwise ruining the vulcanized rubber. Thus it has not been obtained by the above mentioned treatments with acids or alkali lye. By my invention the regeneration may be performed under far milder conditions than by the known regenerating processes, and the rubber is, therefore, much less harmed. To obtain this result mercury is added to the vulcanized rubber, either in a free state as metal or in a combined state as any mercurial compound. Under the influence of the free or combined mercury—under a somewhat raised temperature and by some mechanical treatment alternately—the rubber reassumes the qualities which it had before the vulcanization, so that it may e. g. be again made plastic and vulcanized. When rubber containing foreign matter, e. g. linen inlays, has to be regenerated according to the invention, the mercury may be added either in a free or in a bound state and either before or after the removal of the said foreign matters, because the mercury or mercury compound does not destroy nor has for its purpose the destruction of the said matters or linen inlays, as do certain of the chemicals used by the hitherto known regenerating processes, e. g. strong sulphuric acid. A more or less complete disintegration, such as grinding, may advantageously take place before or simultaneously with the addition of the mercury or its compound, so as to make it easier for this agent to affect all parts of the rubber. It has been supposed that the effect of the mercury in my process is to bind the sulphur employed for vulcanization, mercury and its compounds having great affinity for this material. Although this supposition may be, to some extent, correct, the binding of the sulphur is at all events not the only effect of the mercury in the process according to this invention, it having proved sufficient to use a quantity of mercury which is less than that necessary for the binding of the contents of free and combined sulphur in the rubber. Thus it is to be supposed that at least in part the effect of the mercury in the regeneration depends on mercury or its compounds being able to diminish the aggregation in a similar manner to certain other materials, as e. g. oxygen compounds of rubber, which cannot, however, be employed for regeneration. The effect of the mercury is supposed to be similar to that attained in vulcanization by the sulphur or by sulphur compounds formed in the rubber during vulcanization, only acting in the opposite direction. Further trials with the purpose of diminishing the necessary quantity of mercury or its compounds have shown that the quantity cannot only be diminished below the quantity equivalent to the sulphur taken up during vulcanization, but that in fact a large quantity of vulcanized rubber may be regenerated by use of a very small quantity of mercury or its compounds. E. g. a quantity of about 0.5% Hg calculated relatively to the weight of the vulcanized rubber has proved sufficient in many cases. The experiments show that the characteristic feature of the present regeneration is that mercury is added to the rubber in any form, while the rest of the process may be carried out in many ways. The addition of the mercury or its compound may be carried out in various ways. The mercury may e. g. be added in an elementary form, either as a liquid metal or in any way emulsified, suspended or alloyed with other materials. In the case of liquid metallic mercury this may be mixed with vulcanized rubber in a rolling mill or masticator, whereby the mercury is easily distributed through the rubber. As an example of the use of the elementary mercury in a modified form, the mercury may be emulsified or suspended in water or other liquid in any known manner, so that a liquid or pasty emulsion or suspension is formed, which is mixed with the rubber after or during the pulverization, e. g. in the rolling mill or masticator. Alternatively the mercury may be added in the shape of some mercury compound, which may be added in a dry state or as a solution. In the latter case water or another liquid may be used as a solvent, e. g. an organic solvent such as alcohol or chloroform, wherein various mercury compounds are dissoluble, particularly organic compounds. Mercury compounds may also be used, in a similar way to pure mercury, in the shape of emulsions or suspensions in some liquid. When the mercury has been added it must have an opportunity to exert its effect. This may be done in many different ways, and as neither high temperatures nor pressures nor powerful chemicals are necessary it may take place under conditions which are very lenient to the rubber. Preferably the temperature may be raised, as the speed of the reaction increases therewith. Mechanical treatment, as e. g. rolling or mastication, seems also to be in most cases preferable if not necessary. In order to give the mercury opportunity of exerting its influence the rubber mixed with mercury or a compound thereof may e. g. be left for some time at a suitable temperature, the time and temperature being decided by experiments. The mass resulting herefrom may be treated thereafter until it is cohesive and plastic in the desired degree. Otherwise the effect of the mercury may be made to be during the working itself, this being continued e. g. in a rolling mill or a masticator until the mass becomes cohesive and attains the desired plasticity. Finally, the mercury may affect the rubber while the latter is in a dissolved state, the solution being then merely left to itself at a suitable temperature until the rubber has regained the qualities of unvulcanized rubber. It is not necessary positively to remove the mercury before revulcanizing the regenerated rubber as apparently the mercury or mercury compounds become inactive during the process—possibly partly by being converted into sulphide, the regenerative action of which is comparatively small, and partly because it vaporizes. Further, revulcanizing is carried out under quite other conditions than regeneration, viz. in the presence of additional sulphur and accelerators, etc. What is necessary in order to make the invention understood will be more fully explained by the following description of two examples of the carrying-out of the process.

*Example 1*

Waste vulcanized rubber is crushed into a finer or coarser powder which is placed in a wooden vessel provided with stirrers. Here a solution of mercuric nitrate, in dilute nitric acid is added, the nitric acid being e. g. half-normal and containing the said nitrate in such concentration that a quantity of mercury corresponding to .5% Hg relatively to the weight of dry rubber is employed, when so much liquid is added that the rubber powder is evenly moistened in all parts. When the mercurial salt has been added, the rubber powder is put into a drying chamber where it is dried e. g. at 100–105° C. When the drying is carried out at this temperature the mercury will react during the drying to such an extent that the rubber powder becomes partly liquid. Now the rubber is removed from the drying chamber and put into a masticator where it is masticated under the conditions usual in the treatment of raw rubber until a plastic mass is produced. The said mass may be stored for later use, but I may also at once during the mastication add the customary additions necessary to produce a raw mixture from which a "plate" etc. may be made in calenders, and which may be vulcanized in the usual manner. Preferably some percentage of raw rubber may be added in order to air the mastication. What materials must be added to the regenerate in order to produce a new raw mixture depends to a certain degree on the kind of vulcanized rubber dealt with, but generally the preparation for vulcanization and the latter itself are carried out in quite the same manner as in the treatment of raw rubber.

*Example 2*

Vulcanized rubber is crushed as stated in Example 1, whereupon a small quantity of metallic mercury or a solid salt thereof is mixed therewith on hot rollers. When the mixing is completed, the mixture is left for some hours at a suitably raised temperature, whereupon regeneration is finished in a rolling mill or masticator, preferably with the addition of a small quantity of raw rubber, until a plastic mass is formed. Instead of the mixture being left to itself the whole reaction may take place in a rolling mill or masticator, in which case the treatment must last for a time sufficient for plastifying. The product resulting herefrom has the same nature and the same capabilities of application as in Example 1. The examples illustrate only a few ways in which the addition of mercury may take place, and in which the reaction is carried through in the mixture thus produced, but it will be understood from these examples that the process may be varied in numerous ways. It appears also from the examples that the process may be carried out under conditions much more lenient to the rubber than the regenerating processes hitherto known. E. g. the temperature may be kept during the entire process below the temperatures employed in most of the known regenerating processes, and at no time during the treatment is it necessary to employ powerful chemicals, the process being on the contrary capable of being carried through without addition of other agents than mercury or a compound thereof. The process is not bound to the devices specified in the examples, but any suitable device may be employed for the addition of mercury in metallic or combined form, for the heating, and for the mechanical treatment.

I claim:

1. Process for reclaiming vulcanized rubber wherein a quantity of mercury amounting only to a fraction of that equalizing the amount of sulphur contained in the vulcanized rubber is incorporated with the rubber refuse, whereafter the mixture is subjected to a treatment involving disaggregation of the rubber.

2. Process as claimed in claim 1 wherein the treatment involving disaggregation of the rubber containing mercury is a heat-treatment.

3. Process as claimed in claim 1 in which the treatment involving disaggregation of the mercury-containing rubber mixture includes working on rollers.

4. Process for reclaiming vulcanized rubber wherein 0.5% metallic mercury is incorporated with the rubber refuse whereafter the mixture is subjected to a treatment involving disaggregation of the rubber.

5. A process for reclaiming vulcanized rubber wherein a quantity of nitrate of mercury amounting to only a fraction of that equalizing the amount of sulphur contained in the vulcanized rubber is incorporated with the rubber refuse whereafter the mixture is subjected to a treatment involving disaggregation of the rubber.

6. A process as claimed in claim 5 wherein the treatment involving disaggregation of the rubber containing nitrate of mercury is a heat treatment.

7. A process as claimed in claim 5 in which the treatment involving disaggregation of the rubber mixture containing nitrate of mercury includes working on rollers.

8. A process for reclaiming vulcanized rubber wherein an amount of nitrate of mercury equivalizing 0.5% metallic mercury is incorporated with the rubber refuse whereafter the mixture is subjected to a treatment involving disaggregation of the rubber.

In testimony whereof I affix my signature.

OLOF GUSTAV BOHLIN.